(12) United States Patent
Hodac

(10) Patent No.: US 6,332,365 B1
(45) Date of Patent: *Dec. 25, 2001

(54) METHOD AND DEVICES FOR DETECTING FLEXURE, AND STRUCTURE SUCH AS A GEOTECHNICAL OR BUILDING STRUCTURE EQUIPPED WITH SUCH A DEVICE

(76) Inventor: Bernard Hodac, 85 rue Damrémont, F-75018 Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,144
(22) PCT Filed: Apr. 30, 1997
(86) PCT No.: PCT/FR97/00778
    § 371 Date: Sep. 9, 1999
    § 102(e) Date: Sep. 9, 1999
(87) PCT Pub. No.: WO97/42463
    PCT Pub. Date: Nov. 13, 1997

(30) Foreign Application Priority Data

May 3, 1996 (FR) .................................. 96 05581

(51) Int. Cl.$^7$ ........................................................ G01L 1/24
(52) U.S. Cl. ................................................. 73/800; 73/849
(58) Field of Search .............................. 73/768, 800, 812, 73/849, 852

(56) References Cited

U.S. PATENT DOCUMENTS

| | | | |
|---|---|---|---|
| 4,175,445 | * 11/1979 | Templeton, III | 73/768 |
| 4,477,726 | * 10/1984 | Reichi | 250/237 G |
| 4,634,217 | 1/1987 | Levacher et al. | |
| 4,840,480 | 6/1989 | Starke et al. | |
| 4,972,073 | 11/1990 | Lessing | |
| 5,044,205 | 9/1991 | Wolff et al. | |
| 5,129,010 | * 7/1992 | Higuchi et al. | 382/154 |
| 5,652,395 | * 7/1997 | Hirano et al. | 73/849 |
| 5,750,901 | * 5/1998 | Vali et al. | 73/800 |
| 6,006,608 | * 12/1999 | Renz et al. | 73/800 |

FOREIGN PATENT DOCUMENTS 2 136 119   9/1984   (GB).

* cited by examiner

*Primary Examiner*—Max Noori
(74) *Attorney, Agent, or Firm*—Young & Thompson

(57) ABSTRACT

To detect by means of a long-baseline system the global bending strain of a structure (1), i.e. by detecting the accumulated local bending strains over a distance of at least two meters, detection lines (8, 11), preferably optical fiber lines, which indicate the extent of their elongation by an increased attenuation of the light pulses which run through them, are used. To detect the direction and the extent of the flexure of the structure (1), the latter is closely associated with a model comprising a matrix (13) which follows the flexural bending strains of the structure (1), and at least one, preferably two detection lines (8, 11) suitably located in the matrix cross-section so that their elongation variations and/or the differences between their respective elongation variations are indicative of the flexure of the model, which gives indications on the flexure of the structure (1). The invention is useful in determining the straight or distorted flexure or contraflexure of structures not easily accessible or partially inaccessible, to measure level variations on one or several axes.

32 Claims, 3 Drawing Sheets

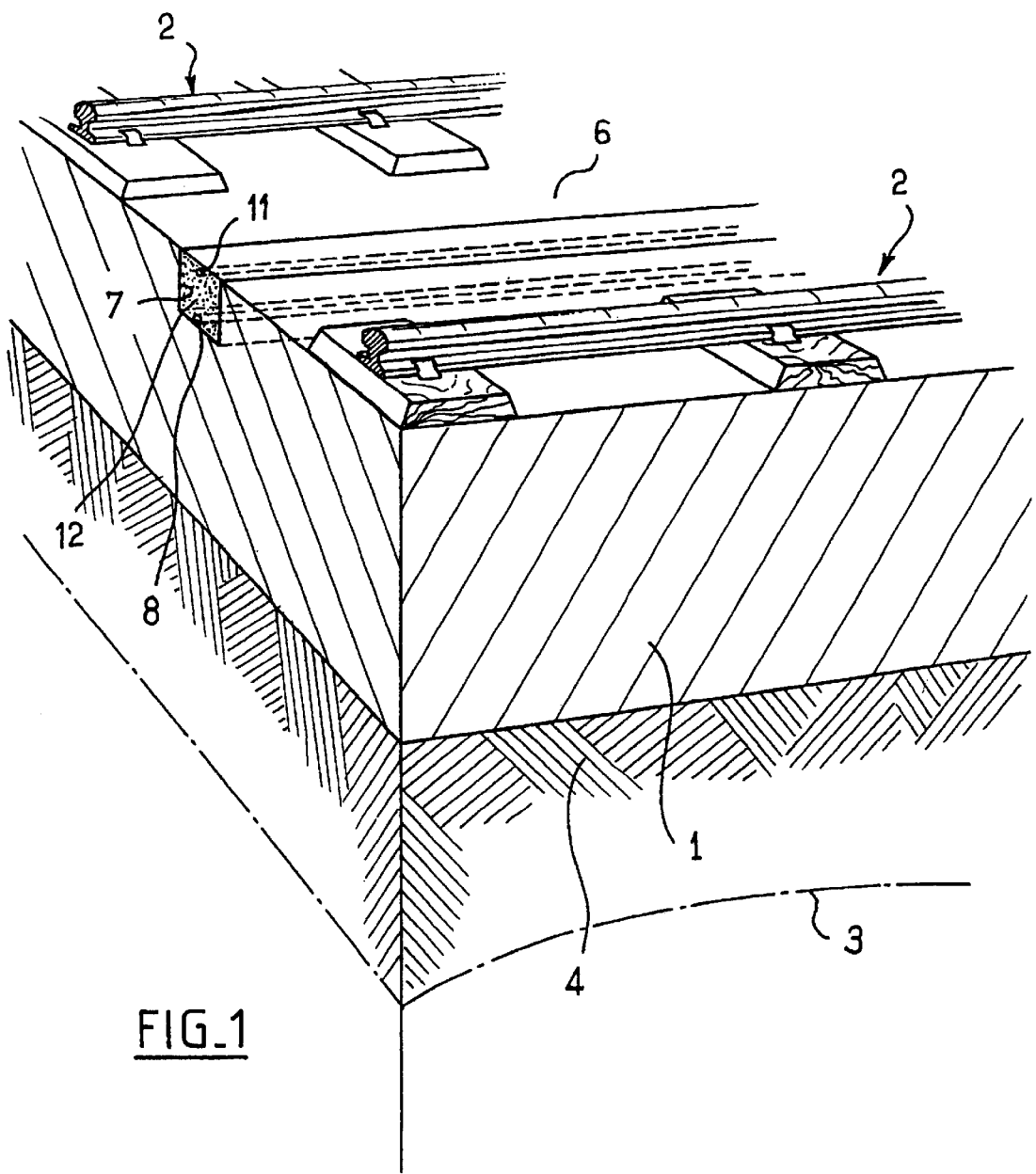
FIG_1
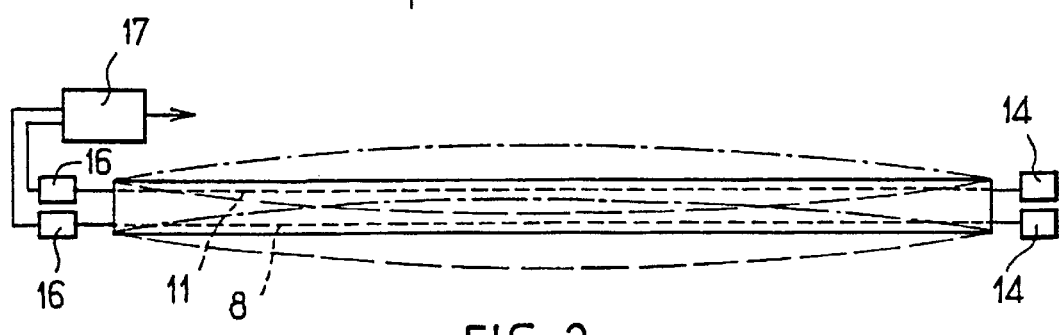
FIG_2

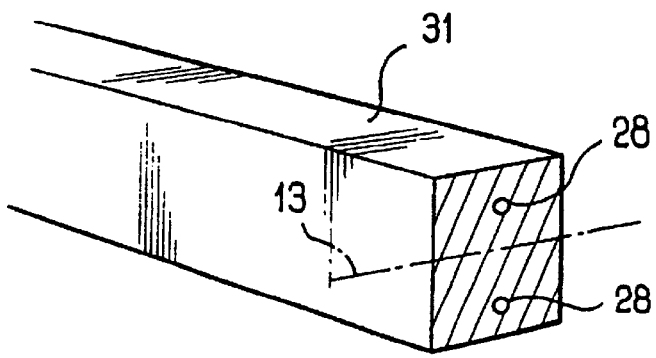
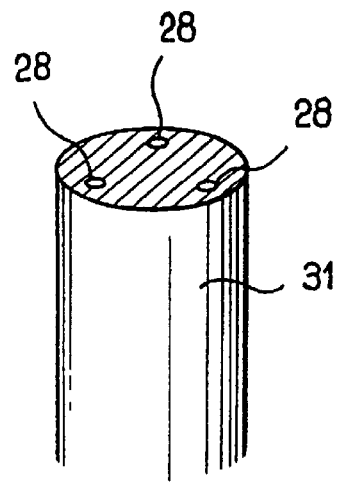
FIG_7
FIG_8
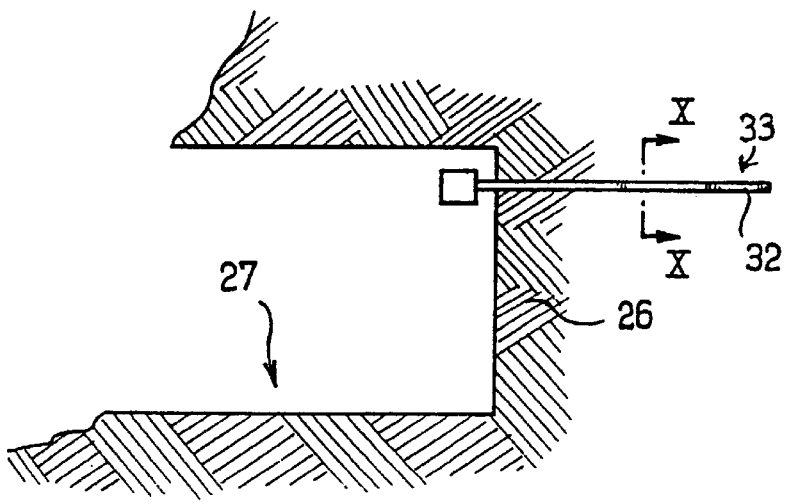
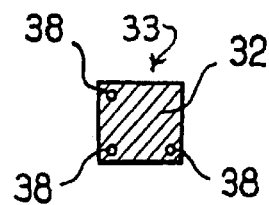
FIG_9
FIG_10

METHOD AND DEVICES FOR DETECTING FLEXURE, AND STRUCTURE SUCH AS A GEOTECHNICAL OR BUILDING STRUCTURE EQUIPPED WITH SUCH A DEVICE

DESCRIPTION

The present invention relates to a method of detecting flexion in a structure.

The present invention also relates to flexion detection devices.

The present invention furthermore relates to a structure equipped with such a device, for example a geotechnical, mechanical, building or civil engineering structure etc.

From EP-A-0 264 622 it is known to measure a variation in length along a measuring line able to have a length of several meters, decameters or hectometers by means of an optical wave guide which is associated with the structure all along the measuring line. As is well-known, the tensile forces applied on the optical wave guide have the effect of dampening the light pulses sent through the guide in a manner which varies according to the intensity of these forces. By measuring the attenuation of the light pulses, a measurement of the elongation of the wave guide with respect to its nominal length is obtained indirectly from a characteristic curve. EP-A-0 264 622 also reveals the pre-stressing the wave guide in tension in order to be able to also detect a compression of the structure along the line of detection, because of the reduction in the elongation of the guide with respect to its pre-elongated state when the structure is in the rest state. It is also known from EP-A-0 264 622 how to arrange the measuring line along a path which is particularly likely to exhibit a significant variation in length in a predetermined direction under the effect of the load applied to the structure. The variations in length of the measuring line will be interpreted in terms of flexion of the structure or of the part of the structure in question.

This known method does however have various limitations.

Firstly, errors are possible in certain cases, in particular when the structure does not deform in the predicted manner. In such a case the interpretation of the measured elongation will be inexact. Secondly, it is not always possible to place the measuring line in the position which would be the most favourable for the application of the known detection method.

The purpose of the present invention is to overcome these disadvantages by proposing a detection method and devices which make it possible to determine the orientation and amplitude of flexion with remarkable reliability even on structures of which certain parts at least are very difficultly accessible, like structures that are partially or totally buried in the ground, and/or exposed to road or rail traffic etc.

An idea which is at the basis of the invention consists in associating with the structure a model for which it is easy to predict the deformation modes and the effects of these deformations on a measurement line. The deformation of the model is evaluated and conclusions are drawn therefrom regarding the deformation of the structure or the part of the structure in question.

Thus, according to a first aspect of the invention, the method for detecting flexion in a structure is characterised in that there is coupled in flexion with the structure a long-shaped model having in cross-section at least one dimension which is sufficiently large that under the effect of flexion, the elongations are sufficiently different at the two ends of this dimension, at least one detection line having a length at least equal to about two meters being suitably positioned with respect to the cross-section of the model and/or with respect to the positioning of the model in the structure so that the variations in length detected by means of the measuring line can be interpreted in terms of direction and amplitude of the flexion of the model.

The measuring line gives results which can be interpreted for the deformation of the model and these results can, in their turn, be interpreted in order to know the deformation of the structure itself, or for the section of structure concerned itself.

Two main lines of development of the idea which is at the basis of the invention and more particularly of the above method are envisaged.

According to a first line, the model comprises a matrix which is heterogeneous with respect to the structure and it is stressed in flexion with the structure, and the detection line, judiciously placed in the matrix, undergoes variations of length which reveal the deformation in flexion of the matrix.

For implementing this first line of development, it is possible to place the matrix in a groove in material bound to the structure, for example a groove formed in a face of the structure or a grove produced by means of a gutter or casing fixed to the structure. The matrix becomes deformed in flexion with the structure, and there is at least one detection line which is associated with the matrix and makes it possible to measure its deformation in flexion, and consequently that of the structure.

According to another line of development of the idea which is at the basis of the invention, the model essentially comprises two detection lines which are associated with the deformation in flexion of the structure and which are sufficiently separated from one another for this flexion to cause them to undergo different variations in elongation. By comparatively analysing the variations in length undergone by the two detection lines, indications of the flexion of the structure can be derived therefrom.

It is even possible to provide at least a third detection line spaced from the other two and not coplanar with them in order to obtain indications of the flexion in two planes forming an angle between them, in particular two perpendicular planes.

The two lines of development are compatible: it is possible to provide two lines of detection separated from one another or even three line of detection which are not coplanar in the matrix according to the first line of development.

Furthermore, the number of detection lines is not limited to three, at least one fourth line can be provided, for example for corroboration purposes.

The detection lines can in practice be materialised by pre-elongated optical wave guides cords. This technology is preferred because it provides very accurate measurements of the integral of the local deformations, without drift. But many other technologies could be envisaged (measurement of mechanical tension or of electrical resistivity of a wire, etc.) provided that they allow "long-based" detection.

The invention relates in fact to the field of measurement known as "long-based". This expression indicates that the deformation of a structure or of a part of structure is perceived on a macroscopic scale over a distance which is of the order of one meter, one decameter or one hectometer, that is to say not locally or at a particular place such as can be achieved by strain gauges or inclinometers, nor simply between two separated points, but by the cumulative picking up of local phenomena over a section considered to be critical. In this way there is obtained an average of the deformations which is representative of the overall deformation at the place considered to be critical.

According to a second aspect of the invention, the flexion detector device is characterised in that it comprises at least one line for detecting length variations, having a length of at least about two meters, closely bonded with a matrix intended to be coupled in flexion with the structure whose flexion is to be determined, the detection line being off-centred with respect to the cross-section of the matrix.

According to a third aspect of the invention, the flexion detector device is characterised in that it comprises at least two length variation detection lines, having a length of at least about two meters, and disposed parallel with and closely bonded to a structure whose flexion is to be detected, and means of comparatively analysing the length variations undergone by the two detection lines.

According to a fourth aspect of the invention, the latter also relates to a structure such as a geotechnical, civil engineering, building, mechanical and similar structure equipped with a device according to the second or third aspect.

Other features and advantages of the invention will furthermore emerge from the following description relating to non-limitative examples.

In the appended drawings:

FIG. 1 is a diagrammatic perspective view, with a cross-section in two perpendicular planes, of an example of implementation of the invention to provide safety in the drilling of a tunnel under an existing railway;

FIG. 2 is a diagrammatic view in elevation of the detector device shown in FIG. 1;

FIGS. 7 and 8 are two cross-sectional and perspective views of two other implementations of the invention;

FIG. 9 is a view in longitudinal cross-section illustrating the implementation of the invention in the ground ahead of the working face of a tunnel in the process of being bored; and FIG. 10 is a view in transverse cross-section of the model used in the implementation shown in FIG. 9, at a larger scale.

Figure 3:
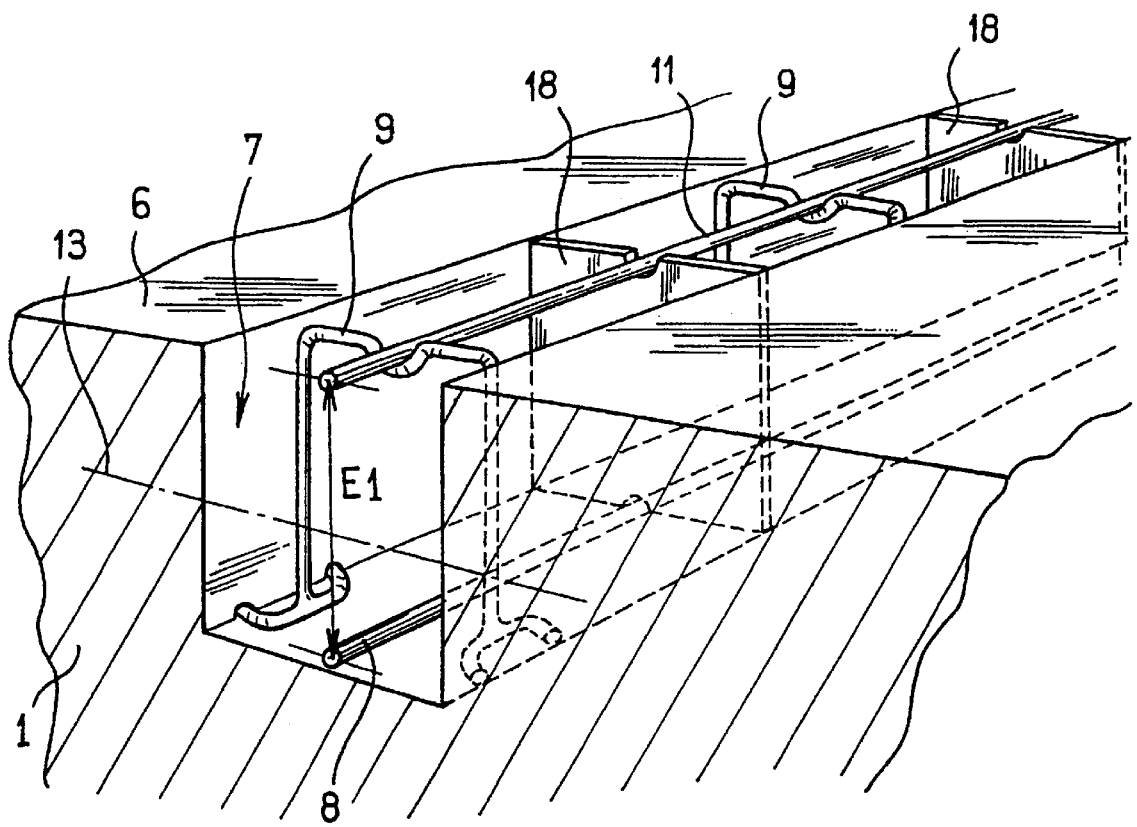
FIG. 3 is a diagrammatic view in perspective with cross-section and tear-away illustrating the method according to the invention at the stage of positioning the model.

In the example shown in FIG. 1, a masonry bed 1 supports two parallel rail tracks 2. The boring of a tunnel 3 orientated perpendicular to the rail tracks 2 is envisaged through the ground 4 which supports the bed 1. The problem arises of knowing if and how the bed 1 will flex.

A simple length measurement carried out on the upper surface of the bed 1 presents a risk of leading to errors of interpretation and furthermore the lower face of the bed 1 is totally inaccessible.

According to the invention, there is hollowed into the upper face 6, and therefore the accessible face of the bed 1, a groove 7 having a rectangular or square profile for example of side length 30 cm. The groove 7 is oriented parallel with a vertical plane in which the curvature due to the main flexion expected will be observable. In the illustrated case, this direction is parallel with the rails 2.

Then, as more precisely shown in FIG. 3, there is placed in the bottom of the groove 7 a first detection line 8 extending all along the groove 7 and parallel with the latter. There is then placed in the groove 7, at regular intervals, supports 9 and then a second detection line 11 which the supports 9 maintain substantially in the centre of the opening of the groove 7, and therefore at a substantially maximum vertical distance from the first detection line 8.

The detection line 11 is also straight and parallel with the longitudinal direction of the groove 7, and extends all along the latter, whose length can be several meters.

The two detection lines 8 and 11 are preferably optical wave guide cords, such as described in EP-A-0 264 622. They are capable of detecting both a decrease and an increase in their length with respect to their initial pre-elongated state.

There is then cast into the groove 7 a mass of substance 12 forming a matrix which on the one hand adheres to the walls of the groove 7 and on the other hand traps the detection lines 8 and 11 by adhering to them in order to form with the latter a model which will in service undergo flexions which are indicative of the flexion of the bed 1. Due to the separation El between the two measuring lines 8 and 11 in the plane of the cross-section of the groove 7 perpendicular to the axis 13 of the flexion to be detected, this flexion will cause different variations in length in the detection lines 8 and 11.

As shown in FIG. 2, each detection line 8 and 11, including an optical fibre as an optical wave guide, is associated at one of its ends with a light pulse transmitter 14 and, at its other end, with a respective receiver 16 detecting the damping of the pulses in the line 8 or 11 which is associated with it. Calculating means 17 calculate the flexion of the model by analysis of the difference between the length variations of the two detection lines 8 and 11. Those skilled in the art know how to carry out such analysis based on the fact that for a given length of the two lines and a given separation El between the two lines, each difference in elongation corresponds to a radius of curvature and consequently to a specific deflection of the model. In FIG. 2 a negative deflection (an upward bulging of the model) has been shown in dotted and dashed line; and in long dashed line there has been shown a positive deflection (a downward flexion of the model). According to the sense of the difference between the elongations of the two detection lines, the calculating means 17 can distinguish and indicate the sense of the flexion, from among the two senses which have just been described. Taking account of the close bond between the model and the structure, that is to say the bed 1, for which it is desired to know the deformation under flexion, the indications given by the means 17 with regard to the model can be transposed to represent the structure. Even though the invention is mainly applicable to determining deflections, it is noted that the mean elongation along detection lines is also easy to calculate by taking the mean of the elongation of the two detection lines 8 and 11.

For the mass constituting the matrix, a material is chosen which is more easily deformable than the structure itself, in order that the model may follow the deformations of the structure without significantly participating in the strength of the structure and without exhibiting the risk of becoming detached from the structure when the latter is under load. A casting of cement, a resin, a rubber or an elastomer are suitable. It is more economical for the chosen material to be a filling of cement. In a way which is itself known by those skilled in the art, the filling will be formulated such that it is susceptible to micro-cracks. In this way it is ensured that the model has little mechanical strength of its own and consequently follows the movements of the structure well. For greater reliability it is also possible to place in the groove 7, before casting the matrix in it, screens 18 which divide up the length of the groove 7 in a substantially fluid-tight manner. The matrix will therefore be subdivided into segments between which the screens 18 function like artificial cracks in the matrix. The screens 18 are made of a material, such as polytetrafluoroethylene, chosen such that at least one of their faces is non-adherent to the mass constituting the matrix.

Figure 4:
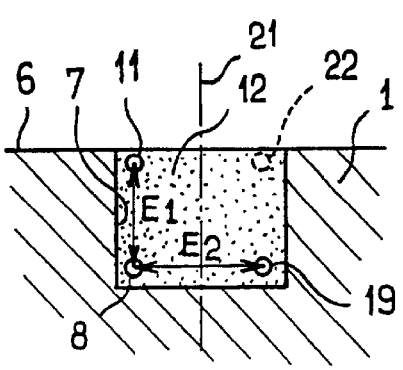
FIGS. 4 and 5 are two cross-selectional views relating to two variants of the device shown in FIGS. 1 and 2.
Figure 5:
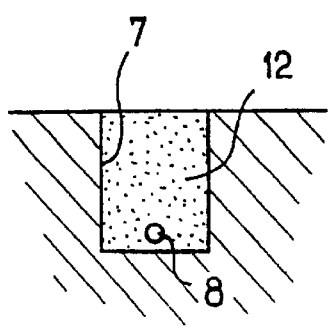
Figure 6:
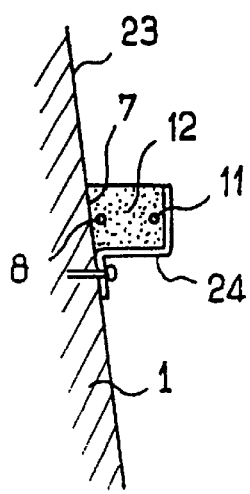
FIG. 6 is a view in cross-section of another embodiment of the device.

The embodiments shown in FIGS. 4 to 6 are only described where they differ with respect to the one shown in FIGS. 1 to 3.

In the example shown in FIG. 4, the two detection lines 8 and 11 have been shifted towards one of the lateral walls of the groove 7 and a third detection line 19 has been placed in the vicinity of the angle between the bottom of the groove and the opposite lateral wall of the groove 7. There is therefore, between the first and third detection lines 8 and 19, a significant distance E2, approximately equal to E1 but oriented perpendicular to E1. The detection lines 11 and 19 are thus situated on two perpendicular planes intersecting along the detection line 8. By analysis of the difference between the length variation undergone by the detection lines 8 and 19 respectively, there is also obtained information on a possible component of deformation of the model by flexion about a vertical axis 21. The invention thus makes it possible to determine, in orientation and amplitude, the complex flexions producing a buckling of the observed structure. There can even be provided a fourth detection line 22, for example in the vicinity of the fourth longitudinal edge of the groove 7, for the purpose of corroboration of the measurements and calculations taken and carried out on the basis of the other three lines.

In the example shown in FIG. 5 there is, on the contrary, only one detection line 8, placed in a distinctly off-centred position in the matrix 12, for example, as shown, in the same position as the detection line 8 shown in FIG. 3, that is to say in the vicinity of the bottom of the groove 7. This implementation can be envisaged when the direction of the flexion is known in advance and all that is necessary is to determine its amplitude. The amount of off-centring is chosen such that there is a distance between the detection line 8 and the zone called "neutral fibre", of the matrix 12, which will undergo neither extension nor compression under the effect of the expected flexion.

Instead of sinking a groove in the structure whose flexion it to be determined, it is possible to fix to the structure a member forming a gutter in which the mass 12 forming the matrix will be cast. This possibility is illustrated in FIG. 6 in the case in which the structure 1 is a support wall in which a bulging is feared which can be observed in a horizontal plane. For this purpose, there is fixed against the apparent face 23 of the wall a profile 24 defining a groove 7 in conjunction with the face 23 of the wall. The two detection lines are this time disposed at a distance from one another in a same horizontal plane and they are as before trapped in the matrix 12 which is cast in the groove 7 and bonded with the walls defining the latter.

In the examples of FIGS. 7 and 8, the structure 31 whose flexion is to be determined is a body of elongated shape, namely a beam in FIG. 7 and a pile or pillar in FIG. 8. The model consists of several detection lines 28 which are oriented parallel with the length of the structure 31, suitably separated from one another and parallel with one another. To achieve this the lines 28 have been embedded at the time of manufacture of the structure 31 in the mass of the material constituting the structure 31, at least a portion of this mass being able to be considered as constituting at the same time a matrix of the model, joining the two, or respectively, the three detection lines firmly with each other and with the structure 31.

In the example shown in FIG. 8, the three detection lines 28 are placed at 120° from one another about the axis of the structure. This angularly symmetrical arrangement is favourable for avoiding to preselect certain flexion axes with respect to which the detection will be more accurate, to the detriment of the other axes, especially when it is a matter of a vertical structure like a pile or pillar which has a risk, a priori, of flexing in any direction whatsoever. On the contrary, in the beam shown in FIG. 7, there are only two detection lines 28, situated on either side of the axis 13 of the expected flexion. The detection lines 28 will, in both examples, undergo different variations in length when the structure 31 is subjected to flexion.

In the example shown in FIGS. 9 and 10, the model is shaped like a bar 33 which is driven into the ground or land 26 in order to couple it intimately with the latter at least as regards flexion. The body 32 of the bar 33 constitutes the matrix and has (see FIG. 10) a single off-centred detection line embedded therein, or two detection lines spaced from one another or even, as shown in FIG. 10, three detection lines 38 separated from one another in two different planes. The analysis of the differences between the length variations of the detection lines, or respectively the analysis of the length variations of the single detection line when it is known that the direction of flexion can be assumed, enable the direction and amplitude of the flexion of the model to be known, and consequently that of the land. In such an embodiment, it is convenient that the transmission and reception of light waves takes place at a same end of each detection line. FIGS. 9 and 10 illustrate this embodiment more particularly when applied to the prediction of collapses or of subsidence during the boring of a tunnel 27. The bar 33 is driven into the working face of the tunnel in the process of being bored.

The invention is not of course limited to the embodiments described and illustrated.

The invention is not restricted to the detection of flexion in massive structures, it is also applicable to mechanical constructions. The preferred field of application of the invention is that of structures or parts of structures which are difficultly accessible because the invention then often constitutes the only technology which can be applied. But the invention can also compete favourably, because of its accuracy and its low cost, with other technologies in cases where the latter can be implemented physically.

The invention is applicable to levelling measurements (measurement of variations in level along an axis) and to differential subsidence measurements, which are equivalent to levelling measurements along several axes.

What is claimed is:

1. A method for detecting flexion in a structure comprising the steps of:

coupling for simultaneous flexion with said structure an elongated model having at least one cross-sectional dimension which is sufficiently large that flexion of the model with the structure produces different elongations at both opposed ends of said dimension, said model incorporating, longitudinally arranged therein, at least two detection lines which have a length of at least about 2 meters and which are substantially parallel to each other and have between them a spacing along said at least one cross-sectional dimension, each said detection line being coupled for common longitudinal deformation with said model material directly surrounding said detection line;

sensing respective length variations of said detection lines along a same longitudinal extent of said model;

comparatively analysing said respective length variations of the detection lines; and determining therefrom direction and amplitude of flexural deformation of the model and, consequently, of the structure.

2. A method according to claim 1, comprising the step of producing a close coupling between the model and said structure.

3. The method according to claim 1, wherein there is used for the model, a matrix having a composition different from that of said structure, the detection lines being closely bonded with the matrix.

4. The method according to claim 1, wherein there is used for the model a matrix which is more deformable than a material of said structure so that the model deforms with the structure without significantly participating in the strength of the structure, the measuring lines being closely bonded with the matrix.

5. A method according to claim 1, wherein there is used for the model a matrix made of a material chosen from among: cement casting, resin, elastomer, rubber.

6. A method according to claim 1, wherein zones of artificial cracking are defined in the model.

7. A method according to claim 6, comprising in order to define said zones of artificial cracking, the step of embedding in a matrix of said model transverse screens having at least one face which is non-adherent to the matrix.

8. The method according to claim 1, comprising the step of driving said model into the structure in a direction substantially parallel with the longitudinal direction of the model.

9. A method according to claim 1, applied to boring of a tunnel, wherein the model is driven into a working face into which said tunnel is being bored.

10. A method according to claim 1, comprising the step of providing a third detection line which is non-coplanar with said two detection lines and the flexion is determined about two different axes on the basis of differences between the length variations undergone by the two detection lines and the third detection line.

11. A method according to claim 10, wherein the two detection lines and the third detection line are disposed in two perpendicular planes which intersect along one of the detection lines.

12. A method according to claim 1, wherein there is used a pre-elongated optical wave guide as each said detection line.

13. A method for detecting flexion in a structure comprising the steps of:

forming a groove which is integral with said structure;

longitudinally positioning in said groove along a same longitudinal extent thereof, at least two detection lines being at least two meters long, and having between them a separation along a transverse direction;

casting a mass of material in said groove so that said detection lines are embedded in and coupled for simultaneous local elongation with a matrix formed by solidification of said mass and form with said matrix a model which is coupled for simultaneous flexion with said structure, said separation between said two detection lines being sufficiently large that flexion of the model with the structure produces different elongations at both opposed ends of said separation;

sensing respective length variations of said detection lines;

comparatively analysing said respective length variations of the detection lines; and determining therefrom results of flexural deformation of the model and, consequently, of the structure.

14. A method according to claim 13, comprising the step of producing a close coupling between the model and said structure.

15. A method according to claim 13, wherein there is used for said mass a material composition different from that of said structure.

16. A method according to claim 13, wherein there is used for said mass a material which, as a matrix, is more deformable than the material of said structure so that the model deforms with the structure without significantly participating in the strength of the structure.

17. The method according to claim 13, wherein there is used for the matrix a material chosen from the group consisting of: cement casting, resin, elastomer, and rubber.

18. A method according to claim 13, wherein zones of artificial cracking are defined in the model.

19. The method according to claim 18, further comprising, in order to define said zones of artificial cracking, the step of embedding in said matrix transverse screens having at least one face which is non-adherent to the matrix.

20. A method according to claim 13, wherein the groove is formed by means of a casing which is being secured to the structure.

21. A method according to claim 13, wherein the groove is hollowed into the structure.

22. The method according to claim 13, further comprising the step of providing the model with a third detection line which is parallel and non-coplanar with said two detection lines and is embedded in the matrix, and the flexion is determined about different axes on the basis of differences between the respective length variations undergone by said two detection lines and said third detection line.

23. The method according to claim 22, wherein said two detection lines and said third detection line are disposed in two perpendicular planes which intersect along one of the detection lines.

24. The method according to claim 13, wherein there is used a pre-elongated optical wave guide as each said detection line.

25. A method for detecting flexion in an elongate structure, comprising the steps of:

coupling for simultaneous flexion and simultaneous local elongation with said structure at least two longitudinally arranged detection lines exhibiting with respect to each other a separation measured perpendicular to an axis of flexion to be detected, said separation being sufficiently large that flexion of the structure produces different elongations in said detection lines;

sensing length variations of the detection lines, along a same longitudinal extent of said structure; and by comparatively analysing the respective sensed variations of length of the detection lines, determining direction and amplitude of flexural deformation of the structure.

26. A method according to claim 25, which is applied to a massive structure and wherein, the detection lines produced in the form of elements reacting to length variations by a detectable physical modification, are embedded in the mass of the structure.

27. A method according to claim 25, being applied to a said structure selected from a pile, a beam, a pillar.

28. The method according to claim 25, wherein the step of coupling at least two detection lines comprises coupling three non-coplanar detection lines with the structure and flexion of the structure is determined about two different axes on the basis of differences between the length variations undergone by the three detection lines along said same longitudinal extent.

29. A method according to claim 28, wherein the three detection lines are disposed in two perpendicular planes which intersect along one of the detection lines.

30. A method according to claim 25, wherein there is used a pre-elongated optical wave guide for constituting each detection line, respectively.

31. In a structure whose flexural deformation is to be monitored, a flexion detector device comprising:

an elongated model which is coupled for common flexion with said structure and includes a matrix of material, and at least two detection lines which are at least about two meters long and are responsive to own length variation, and are embedded in the matrix for respective simultaneous local elongation with the matrix, said lines being sufficiently spaced apart from each other, laterally, that said two detection lines undergo significantly different elongations under flexion of the model; and means for sensing respective length variations of said two detection lines along a same longitudinal extent of said matrix and for comparatively analysing the respective length variations undergone by the two detection lines.

32. A device according to claim 31, comprising a third detection line also embedded in the matrix and laterally spaced apart from the two detection lines and means for comparatively analysing the length variations undergone by the three detection lines.

* * * * *